United States Patent

Kühn et al.

(10) Patent No.: US 6,835,767 B2
(45) Date of Patent: Dec. 28, 2004

(54) POLYMER DISPERSIONS CONTAINING STARCH

(75) Inventors: Ingolf Kühn, Schmerbach (DE); Rudolf Schuhmacher, Boehl-Iggelheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/344,118

(22) PCT Filed: Aug. 1, 2001

(86) PCT No.: PCT/EP01/08897

§ 371 (c)(1),
(2), (4) Date: Feb. 7, 2003

(87) PCT Pub. No.: WO02/14393

PCT Pub. Date: Feb. 21, 2002

(65) Prior Publication Data

US 2003/0187135 A1 Oct. 2, 2003

(30) Foreign Application Priority Data

Aug. 11, 2000 (DE) .......................................... 100 39 388

(51) Int. Cl.⁷ .................................................. C08F 2/22
(52) U.S. Cl. .......................... 524/457; 526/78; 527/300; 527/314; 524/504; 524/734
(58) Field of Search ................................ 526/78, 54.24; 527/300, 314; 524/457, 504, 734

(56) References Cited

U.S. PATENT DOCUMENTS

| | | | | |
|---|---|---|---|---|
| 4,835,212 A | * | 5/1989 | Degen et al. | 524/734 |
| 4,855,343 A | * | 8/1989 | Degen et al. | 524/47 |
| 5,130,394 A | * | 7/1992 | Nguyen et al. | 527/300 |
| 6,040,379 A | * | 3/2000 | Luebke et al. | 524/734 |
| 6,310,132 B1 | * | 10/2001 | Sackmann et al. | 524/457 |
| 6,426,381 B1 | * | 7/2002 | Konig et al. | 524/734 |

FOREIGN PATENT DOCUMENTS

| | | |
|---|---|---|
| DE | 36 27 594 | 2/1988 |
| DE | 37 30 887 | 3/1989 |
| EP | 0 276 770 | 8/1988 |
| EP | 0 307 816 | 9/1988 |
| EP | 0 735 065 | 3/1995 |
| EP | 0 924 222 | 6/1999 |

* cited by examiner

Primary Examiner—Tatyana Zalukaeva
Assistant Examiner—Satya Sastri
(74) Attorney, Agent, or Firm—Oblon, Spivak, McClelland, Maier & Neustadt, P.C.

(57) ABSTRACT

A polymer dispersion is prepared by copolymerization of from 20 to 70 parts by weight of a monomer mixture comprising
  a) from 2.5 to 100% by weight of one or more (meth) acrylates of monohydric, saturated $C_3$–$C_8$-alcohols as monomers A and
  b) from 0 to 97.5% by weight of one or more further ethylenically unsaturated monomers as monomers B in 100 parts by weight of an aqueous solution which contains from 5 to 35% by weight of a starch or of a starch derivative by emulsion polymerization in the presence of an initiator containing peroxide groups, by a process in which the initiator and monomers are metered in continuously and wherein, a first amount of initiator is metered in over a first feed period of from 5 to 60 minutes and a second amount of initiator is metered in over a second feed period of from 15 to 180 minutes, the first amount of initiator being greater than the second amount of initiator.

7 Claims, No Drawings

POLYMER DISPERSIONS CONTAINING STARCH

The present invention relates to a process for the preparation of starch-containing polymer dispersions, the starch-containing polymer dispersions themselves and their use.

Polymer dispersions which contain starch or starch derivatives as protective colloids for stabilizing polymer particles are used as sizes and coating compositions for paper. Such polymer dispersions are obtained as a protective colloid by copolymerization of ethylenically unsaturated monomers by free radical emulsion polymerization in water as a solvent in the presence of starch or starch derivatives, which may have been oxidatively, hydrolytically or enzymatically degraded. Peroxide initiators are used.

EP-A 0 735 065 describes the preparation of amphoteric polymer dispersions in the presence of starch and/or starch derivatives by two-stage polymerization. In a first process stage, a monomer mixture comprising ethylenically unsaturated monomers is polymerized in the presence of starch degraded enzymatically and hydrolytically and/or by acid hydrolysis, peroxide, such as $H_2O_2$, being initially taken as a water-soluble free radical initiator with the starch solution or being metered in in combination with reducing components in a continuous feed process. The dispersion obtained in the first stage is polymerized with a further monomer mixture which, in addition to the ethylenically unsaturated monomers A, contains nitrogen-containing monomers B having a basic character. Preferably used free radical initiators are redox systems comprising peroxides and/or hydroperoxides as oxidizing agents and a reducing component, the reducing components being initially taken together with the dispersion prepared in the first process stage and the oxidizing component being metered in simultaneously with the monomer feed.

EP-A 0 307 816 describes the preparation of a paper size, in which the starch in aqueous solution is degraded first enzymatically and then oxidatively in the presence of hydrogen peroxide. Hydrogen peroxide, as free radical initiator, is added all at once to the aqueous solution of the degraded starch and then an emulsion of acrylonitrile and N-butyl acrylate is added continuously.

Simultaneously with the monomer feed, further hydrogen peroxide is continuously metered in separately.

DE-A 36 27 494 describes the preparation of a paper size based on finely divided aqueous dispersions of copolymers of (meth)acrylonitrile, acrylates and, if required, further ethylenically unsaturated monomers in an emulsion polymerization. The copolymerization of the monomers is effected in aqueous solution of a degraded starch in the presence of an initiator containing peroxide groups. In a first stage, a part of the monomers is initially taken together with initiator solution in the aqueous starch solution and is polymerized. Thereafter, in a second stage, the remainder of the monomers and the initiator solution are added continuously or in portions and are polymerized.

The polymer dispersions obtainable by the processes described above are still in need of improvement with regard to their sizing effect.

It is an object of the present invention to provide paper sizes and coating compositions based on starch-containing polymer dispersions having an improved sizing effect.

We have found that this object is achieved by a process for the preparation of a polymer dispersion by copolymerization of from 20 to 70 parts by weight of a monomer mixture comprising a) from 2.5 to 100% by weight of one or more (meth) acrylates of monohydric, saturated $C_3$–$C_8$-alcohols as monomers A and b) from 0 to 97.5% by weight of one or more further ethylenically unsaturated monomers as monomers B in 100 parts by weight of an aqueous solution which contains from 5 to 35% by weight of a starch and/or a starch derivative by emulsion polymerization in the presence of an initiator containing peroxide groups, in which the initiator is metered in simultaneously with the monomers, wherein a first amount of initiator is metered in over a first feed period of from 5 to 60 minutes and a second amount of initiator is metered in over a second feed period of from 30 to 120 minutes, the first amount of initiator being greater than the second amount of initiator.

We have found, surprisingly, that a substantial improvement in the sizing effect of the prepared polymer dispersion results if the starch is oxidatively degraded during polymerization and over the total polymerization period by the peroxide initiator. If a substantial oxidative degradation is carried out over the total polymerization period, the polymer dispersion becomes unstable due to destruction of the protective colloid, which leads to undesirable filtration residues. However, as a result of the novel two-stage initiator feed with less initiator in the second stage, high sizing efficiency of the polymer dispersion can be realized without formation of filtration residue.

Suitable initiators containing peroxide groups are hydrogen peroxide and organic peroxide, hydroperoxides and peroxodisulfates, for example cumyl hydroperoxide, tert-butyl hydroperoxide, sodium peroxodisulfate, potassium peroxodisulfate or ammonium peroxodisulfate.

A preferred initiator is hydrogen peroxide. Hydrogen peroxide can be used as an initiator alone or in combination with a heavy metal salt and, if required, a further reducing agent. Preferably, hydrogen peroxide is used in combination with a heavy metal salt, preferably iron(II) sulfate. Suitable further reducing agents are, for example, ascorbic acid, sodium bisulfite or sodium dithionite. Since even the starch present in aqueous solution itself acts as a reducing agent, the use of a further reducing agent is less preferable. The heavy metal salt is initially taken in general together with the aqueous starch solution.

The monomer mixture is metered continuously into the aqueous solution containing the starch and/or the starch derivative and, if required, the heavy metal salt, simultaneously a first amount of initiator being metered in over a first feed period of from 5 to 60, preferably from 10 to 30, minutes and a second amount of initiator being metered in over a second feed period of from 15 to 180, preferably from 30 to 120, minutes. In general, the first amount of initiator is from 2 to 4 times the second amount of initiator. If the initiator is hydrogen peroxide, the first amount of initiator is preferably from 2 to 4% by weight and the second amount of initiator from 0.5 to 1% by weight, based on the weight of the total amount of monomers metered in.

In general, from 20 to 70, preferably from 40 to 50, parts by weight of a monomer mixture comprising the monomers A and, if required, B in 100 parts by weight of the aqueous solution which contains from 5 to 35, preferably from 10 to 25, % by weight of starch and/or starch derivatives are copolymerized.

Monomers A are, for example, n-propyl acrylate, isopropyl acrylate, n-butyl acrylate, isobutyl acrylate, tert-butyl acrylate, neopentyl acrylate, n-hexyl acrylate, cyclohexyl acrylate and 2-ethylhexyl acrylate. Preferred monomers A are n-butyl acrylate, isobutyl acrylate and tert-butyl acrylate and mixtures thereof.

Suitable further ethylenically unsaturated monomers B are, for example, ethylenically unsaturated $C_3$- to $C_5$-carboxylic acids, such as acrylic acid, methacrylic acid, maleic acid, fumaric acid, itaconic acid and monoesters of maleic acid, styrene, acrylamide, methacrylamide, acrylonitrile, methacrylonitrile, further $C_1$- to $C_{18}$-alkyl (meth)acrylates differing from the monomers A, such as methyl acrylate, ethyl acrylate, decyl acrylate, palmityl acrylate and stearyl acrylate, and basic compounds, such as dimethylaminoethyl methacrylate, dimethylaminoethyl acrylate, diethylaminoethyl acrylate, N-vinylimidazoline and N-vinyl-2-methylimidazoline.

In a preferred embodiment,
a) from 10 to 50, particularly preferably from 20 to 40, % by weight of n-butyl acrylate are copolymerized as monomer A with
b) from 50 to 90, particularly preferably from 60 to 80, % by weight of styrene as monomer B, the sum of the components a) and b) being 100% by weight.

The copolymerization of the monomers A and, if required, B is effected in an aqueous medium in the presence of a starch or of a starch derivative. Suitable starches are natural starches, such as potato, wheat, rice, tapioca and corn starch. Suitable starch derivatives are chemically modified starches, such as hydroxyethylstarch, hydroxypropylstarch or quaternized aminoalkyl-containing starches. The starches or starch derivatives can be subjected to an acidolytic or enzymatic degradation before the beginning of the polymerization reaction. It is also possible to use oxidatively degraded starches which, if required, are further degraded acidolytically or enzymatically before the beginning of the polymerization reaction.

In a preferred embodiment of the invention, oxidatively degraded starch is initially taken in aqueous solution and enzymatically degraded. The enzymatic degradation is stopped and an aqueous heavy metal salt solution is added. A monomer emulsion, containing the monomers A and, if required, B in an emulsifier is allowed to run continuously into this solution. Simultaneously with the monomer addition, the initiator feed is begun. The initiator feed may end with the monomer feed or may be continued beyond it.

However, it is also possible not to start the initiator feed until after the beginning of the monomer feed. What is important is that altogether a smaller amount of initiator is metered in over the second feed period than over the first feed period.

The polymerization temperature is in general from 60 to 100° C., preferably from 75 to 95° C. at normal pressure.

The present invention also relates to the polymer dispersions obtainable by the process described above and to their use as paper sizes and coating compositions.

The Examples which follow illustrate the invention.

EXAMPLES

Example 1 and Comparative Examples C1–C6

Example 1

144 g of an oxidatively degraded starch having a degree of COO$^-$ substitution of 0.03–0.04 and a K value of 34 (determined according to DIN53726) (Amylex 15 from Südstärke) and 298 g of water are initially taken in a polymerization vessel equipped with a stirrer, a reflux condenser, metering apparatuses and a means for working under a nitrogen atmosphere and are heated to 85° C. in the course of 25 minutes while stirring. 1.6 g of a 25% strength by weight aqueous calcium acetate solution and 10 g of a 1% strength by weight commercial enzyme solution (α-amylase, Termamyl 120 L from Novo Nordisk) are then added. After 30 minutes, the enzymatic starch degradation is stopped by adding 16 g of glacial acetic acid. 32 g of a 1% strength by weight aqueous iron(II) sulfate solution are also added. The temperature of the reaction mixture is kept at 85° C. At this temperature, a mixture of 100 g of water, 5 g of 4% strength by weight emulsifier solution (sodium $C_{14}$–$C_{15}$-alkanesulfonates, emulsifier K30 from Bayer AG), 84 g of n-butyl acrylate and 196 g of styrene is added in the course of 90 minutes. The initiator feed begins simultaneously with the monomer feed. In the course of the first 30 minutes, 40 g of a 30% strength by weight hydrogen peroxide solution are added. 13 g of a 30% strength by weight hydrogen peroxide solution are then added in the course of 75 minutes. After the total amount of monomer has been metered in, the temperature is kept at the polymerization temperature up to the end of the initiator feed. Thereafter, cooling to room temperature is effected and the dispersion is brought to a pH of 5. A dispersion having a solids content of 42% by weight, an LT value of 93% (transmission of white light), a particle diameter of 88 nm and a filtration residue of <0.002% by weight, based on the total batch, is obtained.

Comparative Example C1

144.5 g of the oxidatively degraded starch from Example 1 and 303 g of water are initially taken in a polymerization vessel equipped with a stirrer, a reflux condenser, metering apparatuses and means for working under a nitrogen atmosphere and are heated to 85° C. in the course of 25 minutes while stirring. 1.6 g of a 25% strength by weight aqueous calcium acetate solution and 20 g of the 1% strength by weight enzyme solution from Example 1 are then added. After 30 minutes, the enzymatic starch degradation is stopped by adding 16 g of glacial acetic acid. 32 g of 1% strength by weight aqueous iron(II) sulfate solution are also added. The temperature of the reaction mixture is kept at 85° C. At this temperature, a mixture of 100 g of water, 5 g of 4% strength by weight emulsifier solution (emulsifier K30 from Bayer AG), 84 g of n-butyl acrylate and 196 g of styrene is added in the course of 90 minutes. The initiator feed begins simultaneously. 40 g of a 30% strength by weight hydrogen peroxide solution are added in the course of 90 minutes. After the addition of the total amount of monomers, the temperature is kept at the polymerization temperature up to the end of the initiator feed. Thereafter, cooling to room temperature is effected and the dispersion is brought to a pH of 5. A dispersion having a solids content of 42.9% by weight, an LT value of 90%, a particle diameter of 101 nm and a filtration residue of 0.02% by weight, based on the total batch, is obtained.

Comparative Example C2

144.5 g of the oxidatively degraded starch from Example 1 and 330 g of water are initially taken in a polymerization vessel equipped with a stirrer, a reflux condenser, metering apparatuses and means for working under a nitrogen atmosphere and are heated to 85° C. in the course of 25 minutes while stirring. 1.6 g of a 25% strength by weight aqueous calcium acetate solution and 20 g of the 1% strength by weight enzyme solution from Example 1 are then added. After 30 minutes, the enzymatic starch degradation is stopped by adding 16 g of glacial acetic acid. 32 g of 1% strength by weight aqueous iron(II) sulfate solution are also added. The temperature of the reaction mixture is kept at 85° C. At this temperature, a mixture of 100 g of water, 5 g of the emulsifier solution from Example 1, 84 g of n-butyl acrylate and 196 g of styrene is added in the course of 90 minutes. The initiator feed begins simultaneously. 13 g of a 30% strength by weight hydrogen peroxide solution are added in the course of 90 minutes. After the end of the monomer addition, the temperature is kept at the polymerization temperature up to the end of the initiator feed. Thereafter, cooling to room temperature is effected and the dispersion is brought to a pH of 5. A dispersion having a solids content of 43.5% by weight, an LT value of 90%, a particle diameter of 119 nm and a filtration residue of 0.004% by weight, based on the total batch, is obtained.

Comparative Example C3 (According to EP-A 0 735 065)

First Process Stage 500 parts by weight of water are initially taken in a stirred double-jacket container with a paddle stirrer, a reflux condenser and an $N_2$ feed line and 126 parts of potato starch acetate ester having a degree of substitution of 0.03 are added while stirring. Thereafter, 0.3 part by weight of α-amylase is added, and the mixture is heated to 80° C. and kept at this temperature for 2 hours. After the addition of 3 parts by weight of sodium peroxodisulfate, dissolved in 15 parts by weight of water, a mixture of 30 parts by weight of styrene, 15 parts of n-butyl acrylate and 1 part by weight of acrylic acid is metered in continuously over a period of 40 minutes. After the end of the feed, stirring is carried out for a further 60 minutes at 80° C.

Second Process Stage

One part by weight of sodium hydroxymethanesulfinate, dissolved in 10 parts by weight of water, is added to the above dispersion of the first process stage at 80° C. Immediately thereafter, with simultaneous beginning of metering but separately from one another, a mixture of 90 parts by weight of styrene and 45 parts by weight of n-butyl acrylate, a mixture of 16 parts by weight of trimethylammoniumethyl methacrylate chloride in 14 parts of water and a mixture of 3 parts by weight of hydrogen peroxide in 35 parts by weight of water are metered in continuously over a period of 150 minutes. After the end of metering, stirring is carried out for a further 20 minutes at 85° C. and, after cooling, a coagulum-free polymer dispersion having a solids content of 33% by weight, a pH of 5.5 and a mean particle size of 110 nm is obtained.

Comparative Example C4 (According to EP-A 0 735 065)

First Process Stage 500 parts by weight of demineralized water are initially taken in a stirred 1 l double-jacket container with a paddle stirrer, a reflux condenser and an $N_2$ feed line and 315 parts by weight of an oxidatively degraded potato starch are added. Thereafter, 0.3 part of α-amylase is added, the mixture is heated to 80° C. and is kept at this temperature for 2 hours. 3 parts by weight of 37% strength by weight formaldehyde solution are then added. After the addition of a further 3 parts by weight of sodium peroxodisulfate, a mixture of 15 parts by weight of styrene, 30 parts by weight of n-butyl acrylate and 2 parts by weight of acrylic acid is metered in continuously in the course of 35 minutes. Polymerization is allowed to continue for a further hour.

Second Process Stage 1 part of sodium hydroxymethanesulfinate, dissolved in 10 parts of water, is added to the above dispersion of the first process stage at 82° C. Immediately thereafter, with simultaneous beginning of metering but separately from one another, a solution of 3 parts of hydrogen peroxide in 10 parts of water and a solution of 30 parts of trimethylammoniumethyl methacrylate chloride in 20 parts of water and a mixture of 90 g of styrene and 60 g of n-butyl acrylate are metered in continuously over a period of 120 minutes. Polymerization is allowed to continue for a further hour at this temperature and, after the addition of 9 parts of 20% strength by weight sodium hydroxide solution, a coagulum-free dispersion is obtained.

Comparative Example C5 (According to DE-A 36 27 594)

31.8 g of an oxidatively degraded starch and 219 g of water are initially taken in a 1 l four-necked flask equipped with a stirrer, reflux condenser, metering apparatuses and a means for working under a nitrogen atmosphere and are heated to 85° C. for 30 minutes while stirring. 1 g of a 1% strength by weight aqueous calcium acetate solution and 1.6 g of a 1% strength by weight commercial enzyme solution (α-amylase) are then added. After 20 minutes, the enzymatic starch degradation is stopped by adding 4 g of glacial acetic acid. 7 g of a 1% strength by weight aqueous iron(II) sulfate solution and 0.34 g of 30% strength by weight hydrogen peroxide solution are also added. The temperature of the reaction mixture is kept at 85° C. At this temperature, a mixture of 40 g of acrylonitrile and 33.5 g of n-butyl acrylate is added in the course of one hour and, separately therefrom but likewise in the course of one hour, 61 ml of 0.7% strength by weight hydrogen peroxide solution are added. After the total amount of monomers has been metered in, polymerization is continued for a further hour at 85° C. A dispersion having a solids content of 26.3% by weight is obtained. The LT value of the dispersion is 96%.

Comparative Example 6 (According to EP 0 307 816 B1)

In a polymerization vessel equipped with a stirrer, metering apparatuses and means for working under nitrogen, 20.7 parts of an 82% strength by weight aqueous cationic potato starch ($\eta$=0.1 dl/g, degree of substitution 0.025 mol of nitrogen per mol of glucose unit) are dissolved in 133 parts by weight of water at 85° C. while stirring. 3.7 parts by weight of glacial acetic acid and 0.03 part by weight of iron(II) sulfate ($FeSO_4.7H_2O$) are added, followed by 0.8 part of 30% strength by weight hydrogen peroxide solution and, after 20 minutes, a further 0.8 g of 30% strength by weight hydrogen peroxide solution. Thereafter, an emulsion of 44 parts of n-butyl acrylate and 39 parts of styrene in a solution of 0.045 part of sodium laurylsulfate in 29 parts of water is metered in in the course of 2 hours and, beginning simultaneously therewith from a second feed vessel, 14 parts of a 5.5% strength by weight hydrogen peroxide solution. After the end of the monomer and hydrogen peroxide addition, polymerization is continued for a further hour at 85° C. A cationic dispersion having a solids content of 34% by weight and an LT value of 86 is obtained.

Testing of Performance Characteristics

The surface sizing effect of size press liquor (concentration 2 g/l) according to Example 1 and of Comparative Examples 1 to 6 was measured on a paper (70% of birch sulfate and 30% of pine sulfate*) which had not been sized beforehand and contained precipitated calcium carbonate as a filler. The Cobb value according to DIN 53132 and the ink flotation time according to DIN 53126 were determined. The lower the Cobb value and the higher the ink flotation time, the more effective is the size.

The results are summarized in the Table.

TABLE

| Size | Cobb value [g/m$^2$] | Ink flotation time [min] |
|---|---|---|
| Example 1 | 30 | 20 |
| Comparative Example C1 | 35 | 10 |
| Comparative Example C2 | 70 | 2 |
| Comparative Example C3 | 92 | 0 |
| Comparative Example C4 | 106 | 0 |
| Comparative Example C5 | 48 | 7 |
| Comparative Example C6 | 55 | 4 |

By substantial oxidative degradation of the starch (Example 1), it is possible to achieve an improvement in the sizing effect compared to the prior art (Comparative Examples).

Comparative Example C1 shows that a small filtration residue can be achieved only by the two-stage initiator feed according to Example 1. Comparative Example C2 shows that, although little filtration residue is obtained using a small amount of hydrogen peroxide, scarcely any sizing effect is achieved.

We claim:

1. A process for the preparation of a polymer dispersion comprising:
   copolymerization of from 20 to 70 parts by weight of a monomer mixture comprising
   a) from 2.5 to 100% by weight of one or more (meth) acrylates of monohydric, saturated $C_3$–$C_8$-alcohols as monomers A and
   b) from 0 to 97.5% by weight of one or more further ethylenically unsaturated monomers as monomers B
   in 100 parts by weight of an aqueous solution which contains from 5 to 35% by weight of a starch and/or of a starch derivative by emulsion polymerization in the presence of an initiator containing peroxide groups, in which the monomer mixture is metered continuously into the aqueous solution containing the starch and/or the starch derivative and the initiator is metered in simultaneously with the monomers, wherein a first amount of initiator is metered in over a first feed period of from 5 to 60 minutes and a second amount of initiator is metered in over a second feed period of from 15 to 180 minutes, the first amount of initiator being greater than the second amount of initiator.

2. A process as claimed in claim 1, wherein the first amount of initiator is from two to four times the second amount of initiator.

3. A process as claimed in claim 1, wherein the initiator is hydrogen peroxide.

4. A process as claimed in claim 3, wherein the first amount of initiator is from 2 to 4% by weight and the second amount of initiator is from 0.5 to 1% by weight, based on the weight of the total amount of monomers metered in.

5. A process as claimed in any of claims 1, wherein a monomer mixture comprising
   a) from 50 to 90% by weight of n-butyl acrylate as monomer A and
   b) from 10 to 50% by weight of styrene as monomer B is copolymerized.

6. A process as claimed in any of claim 1, wherein the starch or the starch derivative is acidolytically or enzymatically degraded before the beginning of the polymerization.

7. A polymer dispersion prepared by a process as claimed in claim 1.

* * * * *